(12) United States Patent
Melnikov et al.

(10) Patent No.: US 11,068,194 B2
(45) Date of Patent: Jul. 20, 2021

(54) METHOD AND SYSTEM FOR STORING AND MANAGING STATES OF A COMPUTER

(71) Applicant: Acronis International GmbH, Schaffhausen (CH)

(72) Inventors: Oleg Melnikov, Moscow (RU); Vladimir Strogov, Moscow (RU); Alexey Sergeev, Moscow (RU); Serguei Beloussov, Costa del Sol (SG); Alexey Dod, Moscow (RU); Stanislav Protasov, Moscow (RU)

(73) Assignee: Acronis International GmbH, Schaffhausen (CH)

( * ) Notice: Subject to any disclaimer, the term of this patent is extended or adjusted under 35 U.S.C. 154(b) by 0 days.

(21) Appl. No.: 16/455,870

(22) Filed: Jun. 28, 2019

(65) Prior Publication Data
US 2020/0409557 A1    Dec. 31, 2020

(51) Int. Cl.
*G06F 3/06* (2006.01)
*G06F 16/22* (2019.01)

(52) U.S. Cl.
CPC .............. *G06F 3/065* (2013.01); *G06F 3/064* (2013.01); *G06F 3/0619* (2013.01); *G06F 3/0653* (2013.01); *G06F 3/0673* (2013.01); *G06F 16/2246* (2019.01)

(58) Field of Classification Search
CPC . G06F 3/06; G06F 16/22; G06F 3/065; G06F 3/0619; G06F 3/064; G06F 3/0653; G06F 3/0673; G06F 16/2246

USPC .......................................................... 711/162
See application file for complete search history.

(56) References Cited

U.S. PATENT DOCUMENTS

| | | | |
|---|---|---|---|
| 8,195,623 B2 * | 6/2012 | Prahlad | G06F 11/1435 707/679 |
| 8,707,427 B2 * | 4/2014 | Hooks | G06F 21/567 726/22 |
| 8,732,418 B1 * | 5/2014 | Abdulla | G06F 11/1451 711/162 |
| 8,745,003 B1 * | 6/2014 | Patterson | G06F 17/00 707/639 |
| 9,256,498 B1 * | 2/2016 | Leibowitz | G06F 16/27 |
| 9,367,931 B1 * | 6/2016 | Eilam | H04N 19/503 |
| 10,459,655 B1 * | 10/2019 | Greenwood | G06F 11/1451 |

(Continued)

*Primary Examiner* — Christopher B Shin
(74) *Attorney, Agent, or Firm* — Arent Fox LLP; Michael Fainberg

(57) ABSTRACT

Disclosed herein are systems and method for storing and managing states of a computing device. In one aspect, an exemplary method comprises determining an initial state of the computing device, wherein the initial state includes states of all storage sectors associated with the computing device, storing the determined initial state in an initial blocks storage, for each new state that corresponds to a respective point in time subsequent to a time at which the initial state was determined, creating a snapshot, where the created snapshot includes a difference between the initial state and the new state, for each created snapshot, identifying a set of changed blocks that are in storage, and storing the changed blocks of data to a changed blocks storage, and creating a snap-map for any number of consecutive changes based on the sets of changed blocks corresponding to the respective consecutive changes.

24 Claims, 5 Drawing Sheets

(56) References Cited

U.S. PATENT DOCUMENTS

| | | | |
|---|---|---|---|
| 2016/0034481 A1* | 2/2016 | Kumarasamy | G06F 16/128 707/639 |
| 2017/0075765 A1* | 3/2017 | Chen | G06F 11/1469 |
| 2018/0129567 A1* | 5/2018 | Kumarasamy | G06F 11/1451 |
| 2018/0260281 A1* | 9/2018 | Monk | G06F 11/1448 |
| 2020/0019620 A1* | 1/2020 | Sarda | G06F 16/113 |
| 2020/0042466 A1* | 2/2020 | Wohlschlegel | G06F 1/30 |

* cited by examiner

METHOD AND SYSTEM FOR STORING AND MANAGING STATES OF A COMPUTER

FIELD OF TECHNOLOGY

The present disclosure relates to the field of data security, and, more specifically, to systems and methods for managing states of a computer, e.g., to facilitate switching among states that correspond to different points in time.

BACKGROUND

Computing devices may need to be restored for various reasons. For example, an operating system of the computing device may experience corruption and the system may need to be returned to a previous state that corresponds to a time during which the device was properly operating. In another example, the operating system and data may need to be rolled back due to a malware attack. In yet another example, testing installed software may require the ability to roll back to a previous state, e.g., to iteratively test for different scenarios, to return to a previous state when a test fails, etc. Thus, modern computer management may include some way of rolling back a state of the computing device.

The technique for rolling back the state of the computing device may affect the configuration of the computer, the state of the operating system, the state of the user data, etc. For instance, an initial state of the device may include: the initial configuration of the computer (including the operating system), installed software, initial settings of the operating system and/or installed software, the user data, etc. Subsequent states may include changes to configurations, settings, user data, etc. Thus, rolling back from the subsequent state to the initial state would restore the configurations, settings, etc. to the respective ones of the initial state.

There are a few popular approaches for rolling back the state of the computing device. A first approach is to use virtual machines to save different sets of configurations of the computing device, with each set being used to save a virtual copy of the computing device at a given point in time. This approach has several disadvantages. First, the virtual machines are software emulations of the computing device (hardware). The software emulations is often not an exact copy of the real hardware. In some scenarios, the user may use: a rare or specific hardware, and/or a software product that is directly dependent on the rare or specific hardware. For such scenarios, the software emulation may be entirely inapplicable. Second, for virtualized systems, the rollback operations are available only for a virtual copy of the computing device and not the original machine. Thus, this approach is not appropriate for many scenarios wherein the user may need to switch among multiple states.

A second approach is to use a recovery point at the operating system level. For instance, Microsoft Windows provides a technology based on this approach. However, the rollback using the second approach applies only to the state of the operating system and does not include the user data or installed applications. A third approach is based on a chain of incremental backups. For example, Apple provides a Time Machine Program that is based on a chain of incremental backups, and includes an ability to select a date and time of data recovery at a user's request. Each of the above three approaches has a target task. However, all of the above approaches are based on maintaining the state of the entire computing device. Thus, when using the above approaches, switching quickly and/or often between stored entire states is difficult, if not impossible.

Therefore, there is a need for a method of storing and managing states of computing devices that addresses the shortcomings described above.

SUMMARY

Aspects of the disclosure relate to the field of data security and fault tolerance. In particular, aspects of the disclosure describe methods and systems for storing and managing states of a computing device.

In one exemplary aspect, a method for storing and managing states of a computing device, by a data security engine implemented in a computing device comprising a processor, the method comprising: determining an initial state of the computing device, wherein the initial state includes states of all storage sectors associated with the computing device, storing the determined initial state in an initial blocks storage, for each new state that corresponds to a respective point in time subsequent to a time at which the initial state was determined, creating a snapshot, where the created snapshot includes a difference between the initial state and the new state, for each created snapshot, identifying a set of changed blocks that are in storage, and storing the changed blocks of data to a changed blocks storage, and creating a snap-map for any number of consecutive changes based on the sets of changed blocks corresponding to the respective consecutive changes.

According to one aspect of the disclosure, a system is provided for storing and managing states of a computing device, the system comprising at least one processor configured to: determine an initial state of the computing device, wherein the initial state includes states of all storage sectors associated with the computing device, store the determined initial state in an initial blocks storage, for each new state that corresponds to a respective point in time subsequent to a time at which the initial state was determined, create a snapshot, where the created snapshot includes a difference between the initial state and the new state, for each created snapshot, identify a set of changed blocks that are in storage, and store the changed blocks of data to a changed blocks storage, and create a snap-map for any number of consecutive changes based on the sets of changed blocks corresponding to the respective consecutive changes.

In one exemplary aspect, a non-transitory computer-readable medium is provided storing a set of executable instructions thereon for storing and managing states of a computing device, including instructions for: determining an initial state of the computing device, wherein the initial state includes states of all storage sectors associated with the computing device, storing the determined initial state in an initial blocks storage, for each new state that corresponds to a respective point in time subsequent to a time at which the initial state was determined, creating a snapshot, where the created snapshot includes a difference between the initial state and the new state, for each created snapshot, identifying a set of changed blocks that are in storage, and storing the changed blocks of data to a changed blocks storage, and creating a snap-map for any number of consecutive changes based on the sets of changed blocks corresponding to the respective consecutive changes.

In one aspect, when a request to roll back a state of the computing device to a state that corresponds to a given point in time is received, the method further comprises: rolling back the state of a computing device in accordance with the request and the snap-map.

In one aspect, when the rolling back is from one snapshot to another snapshot, unchanged data is used directly from the initial blocks storage while changed date is used by redirecting to the changed blocks storage.

In one aspect, the snapshot is created at least in accordance with: a predetermined schedule, when a change to data is detected, or when the change is detected for a predetermined list of types of data.

In one aspect, a user of the computing device determines the types of data for which the change triggers the creation of the snapshot.

In one aspect, the method further comprises: forming a tree structure of changes by creating branches and sub-branches of changes using the snap-map, and creating any number of chains of snapshots.

In one aspect, the method further comprises: performing, by the computing device, any number of operations with a selected chain of snapshots, the operations including at least one of: creating an archive from a chain of snapshots and responding to a request from a user.

In one aspect, the selected chain of snapshots is virtualized.

In one aspect, the method further comprises: making any number of changes to any set of previously changed blocks, wherein multiple changes are made to the set of previously changed blocks in a serial or in a parallel manner.

In one aspect, the changed blocks storage is located on one or more of: the same computing device, a different computing device, a different storage area of the same computing device, or an external device.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and computer program product for storing and managing states of a computer. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Figure 1:
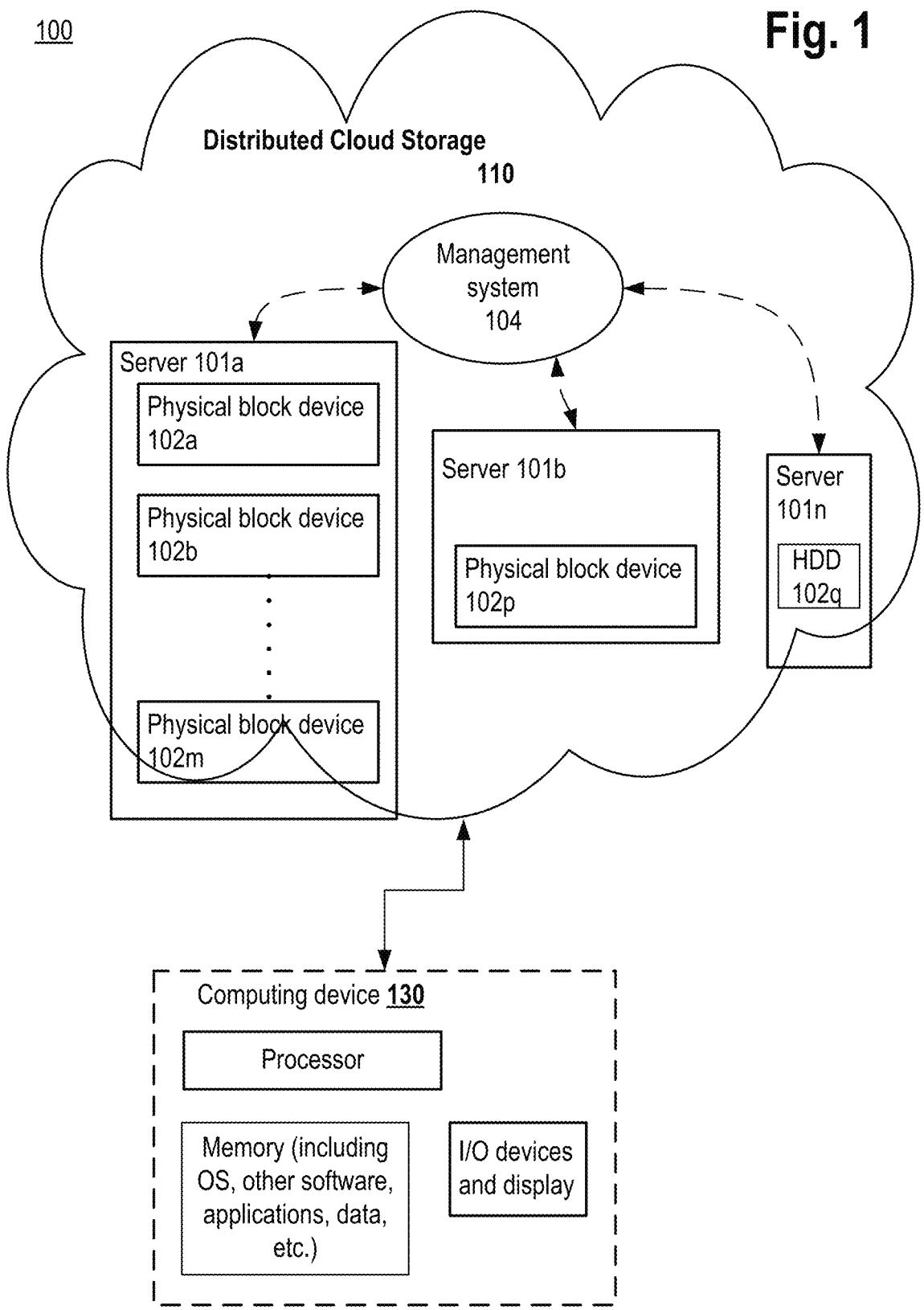
FIG. 1 is a block diagram illustrating a system for storing and managing states of a computer.

FIG. 1 is a block diagram illustrating a system 100 for managing states of a computer using a distributed cloud storage 110. The system 100 includes a computing device 130 whose blocks of data is to be stored and managed. The computing device 130 may comprise a personal computer, server, etc., that includes a computer processing unit ("CPU"), and a memory that includes software for performing various tasks, e.g., Operating System (OS) software, application software, and so on. Blocks of data for the computing device 130 may be stored in the memory of the device itself as well as on other physical devices, e.g., physical devices of a distributed cloud storage 110.

The teachings of the present disclosure are described below for the scenario in which a distributed cloud storage is used for the storage of the states of the computer. However, without any loss of generality, the states of the computer of the present disclosure may be stored in any type of data storage known in the art, e.g., in servers, hard disks. Moreover, the storage may be the computer itself or some other external device, e.g., another computer, server, or any standard external storage (e.g., a compact disk, flash drive, optical disk, and the like).

The distributed cloud storage 110 includes a plurality of hardware servers 101a, 101b, . . . , 101n (hereafter referred to as physical servers or simply as servers). The distributed cloud storage 100 is monitored and managed by a management system 104 deployed across the plurality of servers 101a, 101b, . . . , 101n.

Figure 5:
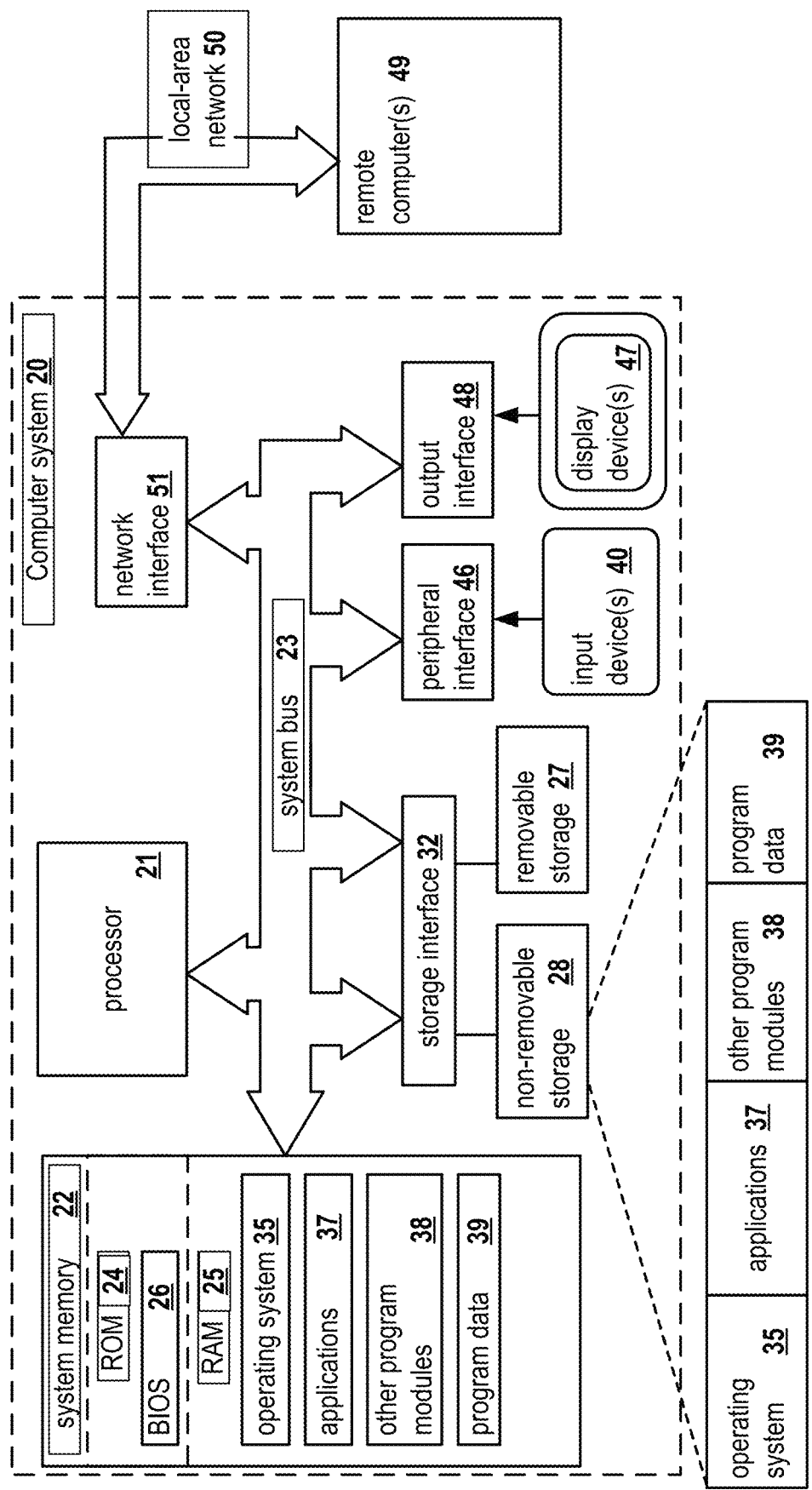
FIG. 5 presents an example of a general-purpose computer system on which aspects of the present disclosure can be implemented.

A server of the plurality of servers 101a, 101b, . . . , 101n may comprise any number of physical components (e.g., as shown in FIG. 5). For example, a server of the plurality of servers 101a, 101b, . . . , 101n comprises a number of physical components, e.g., processors, physical block storage devices (e.g., Hard Disk Drives (HDDs), Solid State Drives (SSDs), flash drives, SMR disks, etc.) or memory (e.g., Random Access Memory (RAM)), I/O interface components, etc. For clarity, only physical components used to illustrate the teachings of the present disclosure are shown in FIG. 1. For the example of FIG. 1, server 101a includes physical block storage devices 102a, server 101b includes physical block storage device 102b, and server 101n includes physical block storage device 102n. The physical servers 101a, 101b, . . . , 101n can be used for storing any type of data uploaded to storage, e.g., for storing user data, data of applications, data of Virtual Machines (VM), file systems, files, etc. Furthermore, the storage may contain VM disk images, root file systems, etc. The storage can be a part of a hyperconvergence platform. In general, the distributed cloud storage 110 may include any number of computing devices (e.g., a personal computers, laptops, servers, etc.) that include a computer processing unit ("CPU") and a memory that includes software for performing various tasks, e.g., installing an OS software, rebooting the servers, and so on.

In order to present the teachings of the present disclosure with clarity, a number of terms and concepts used in describing various aspects of the disclosure, are defined herein.

A sector—a minimum storage unit of a hard drive which is used by modern data storage schemes to store a fixed amount of data accessible by a user. For example, a Hard Disk Drive (HDD) may use 4096 byte (~4 Kbyte) sectors.

Disk partitioning schemes—schemes used to store files in one or more sectors. Typically, a file occupies an integer number of sectors. If the last sector used to store a file is not full, the remainder of that sector is filled with zeroes. Each sector includes two areas: a sector header area and a data area.

Sector header area—a storage area of a sector that is used for address identification, fault tolerance (e.g., error detection and correction), synchronization, etc.

Data area—a storage area of a sector that is used to store user data, error correction codes, synchronization codes, etc.

At a given time, a sector may be referred to as: available, occupied or free space. An occupied sector refers to a sector at which data is stored. A "free space" refers to a sector that is not in use. An available sector refers to a storage area that includes sectors identified as free space and cache memory. In other words, available sector includes all sectors available for use by the computing system. For example, files currently stored in a Random Access Memory (RAM) may be easily removed by the system when they are no longer needed. Thus, the space occupied by such files is available for use, even if currently some file is stored therein.

As described above, traditional techniques for managing states of a computing device are not suitable for the purpose of switching between states quickly and/or often. In one aspect, the method of the present disclosure manages states of the computing device in a manner that enables switching between states quickly and/or often. For example, traditional restoration of a system from a backup may take several hours. In contrast, the method of the present disclosure enables switching between states quickly, e.g., in a few minutes.

Figure 2:
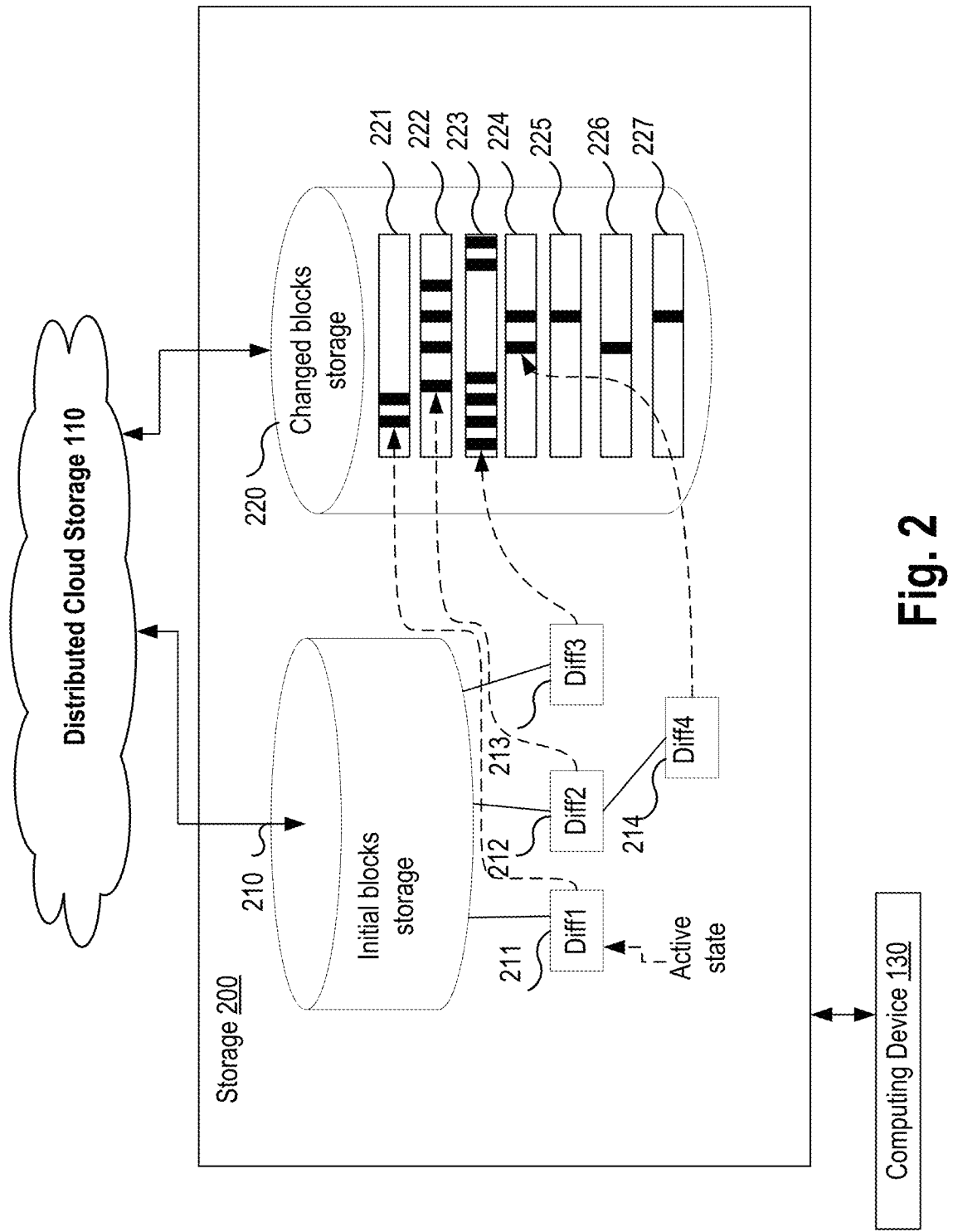
FIG. 2 illustrates storage for storing states and blocks of data of a computing device.

FIG. 2 illustrates storage 200 for storing states and blocks of data of a computing device, e.g., computing device 130. The storage 200 includes at least an initial blocks storage 210 and a changed blocks storage 220. The initial blocks storage 210 is used for storing an initial state of the computing device for all storage sectors. The changed blocks storage 220 is used for storing changed blocks of data. In other words, when a change to the initial state of the computing device is made, the affected blocks of data are identified and the changes are captured in the changed blocks storage 220. Thus, the method of the present disclosure provides the ability to roll back to any state, including the initial state. In one aspect, the initial blocks storage 210 and the changed blocks storage 220 are implemented via the distributed cloud storage, e.g., cloud storage 110 as shown in FIG. 1. However, the initial blocks storage 210 and the changed blocks storage 220 may be storages on a standard server, remote server, on a peripheral storage device, etc. Moreover, both the initial blocks storage 210 and the changed blocks storage 220 do not have to be on a same physical device. The actual physical devices may be based on communications/connectivity needs of the computing device 130. For example, non-shared storage (e.g., on a local server) may be more appropriate for some scenarios.

In one aspect, the method first determines an initial state of the computing device, wherein the initial state includes states of all storage sectors associated with the computing device. The initial state is stored in an initial blocks storage. In one aspect, the storage sectors for which the initial states are determined include: available sectors, occupied sectors, and free spaces. When applicable, the initial state for a given sector is determined along with the data stored therein.

Then, for each new state that corresponds to a respective point in time subsequent to a time at which the initial state was determined, the method creates a snapshot, where the created snapshot includes a difference between the initial state and the new state. For instance, three snapshots may be created at times t1, t2 and t3. The difference between the initial state and the snapshot created at time t1 may be referred to as "diff1" as shown in 211, the difference between the initial state and the snapshot created at time t2 may be referred to as "diff2", as shown in 212, and the difference between the initial state and the snapshot created at time t3 may be referred to as "diff3", as shown in 213. Then, the changed blocks storage includes a first set of changed blocks corresponding to diff1, as shown in 221, a second set of changed blocks corresponding to diff2, as shown in 222, and a third set of changed blocks corresponding to diff3, as shown in 223.

In one aspect, the snapshot is created in accordance with a predetermined schedule. In one aspect, the snapshot is created when a change to data is detected. In one aspect, the snapshot is created when the change is detected for a predetermined list of types of data. For example, a change in configuration data may trigger creation of a new snapshot while saving a text file may not trigger a creation of a new snapshot. In one aspect, the user of the computing device determines the types of data for which a change triggers the creation of a new snapshot.

Then, for each created snapshot, the method identifies a set of changed blocks that are in storage, and stores the changed blocks of data to a changed blocks storage. For example, suppose the snapshot is created on the basis of a copy-on-write operation. Then, for each request to change a particular block of data, a copy of the changed block is created and placed at the changed blocks storage. In another example, suppose a snapshot is created according to a predetermined schedule, e.g., daily. When a given snapshot is being created, changes are captured for a 24-hour period, a copy of all changed blocks during the given 24-hour period is made, and the copy is stored in the changed blocks storage. It is noted that each snapshot corresponds to its own set of changed blocks of data that are in storage.

In one aspect, the changed blocks storage may be located on one or more of: the same computing device, a different computing device, a different storage area of the same computing device, or an external device. In one aspect, the external device comprises a server, a disk (e.g., a compact disk, flash drive, optical disk, and the like), or a distributed cloud storage.

Then, the method creates a snap-map for any number of consecutive changes based on the sets of changed blocks corresponding to the respective consecutive changes. For example, a snap-map may be created for consecutive changes that correspond to a time period. For instance, all changes made in a 30-day month may be captures in a snap-map created for the month.

Once the snap-map is created, the state of the computing device may be rolled back to any arbitrary previous state. In other words, based on the snap-map, when a request to roll back the state of the data for the computing device is received, the state of the data may be returned to a requested state. For the example described above, there are 30 sets of changed blocks in storage corresponding to 30 days. Then, based on the request, the state may be returned to any state that corresponds to one of the 30 days. It is noted that the data could also be rolled back to the initial state, i.e., prior to any of the 30 sets of changed blocks being written.

In one aspect, when the rolling back is from one snapshot to another snapshot, unchanged data is used directly from the initial blocks storage while changed date is used by redirecting to the storage of the changed blocks. For example, the changed blocks for the given snapshot were previously stored in the changed blocks storage. The data of the changed blocks are then read from the appropriate set of previously stored changed blocks.

In one aspect, the snap-map is used to create branches and/or sub-branches of changes—thereby forming a tree structure of changes, wherein all changes share the initial state. For instance, suppose snapshots are created at times t1, t2 and t3, as described above. Then, suppose the set of changed blocks that correspond to diff2 are further changed at time t4. A fourth snapshot may then be created to capture the additional changes. The difference between diff2 and the snapshot created at time t4 may be referred to as "diff4", as shown in 214. The changed blocks storage is updated to include a fourth set of changed blocks corresponding to diff4, as shown in 224.

In one aspect, any number of modifications may be made to any set of previously changed blocks. In one aspect, multiple modification are made to the set of previously changed blocks in a serial manner. In one aspect, multiple modifications are made to the set of previously changed blocks in a parallel manner.

For instance, suppose the set of changed blocks that correspond to diff4 are further changed at time t5. A fifth snapshot may be created to capture the additional changes. The difference between diff4 and snapshot created at time t5 may be referred to as "diff5". The changed blocks storage is updated to include a fifth set of changed blocks corresponding to diff5, as shown in 225. Now, consider two scenarios: a first scenario in which the set of changed blocks that correspond to diff4 are further changed at time t6, and a second scenario in which the set of changed blocks that correspond to diff5 are further changed at time t6. For both scenarios, a sixth snapshot is created to capture the additional modifications. For the first scenario, the difference between diff4 and the snapshot created at time t6 is referred to as "diff6". For the second scenario, the difference between diff5 and the snapshot created at time t6 is referred to as "diff6". For both scenarios, the changed blocks storage is updated to include the sixth set of changed blocks corresponding to diff6. As the example illustrates, the first scenario is for multiple modifications made at times t5 and t6 to the snapshot created at time t4, wherein the multiple modifications are made in a parallel manner, as shown in 226. In contrast, the second scenario is for multiple modifications made at times t5 and t6 to the snapshot created at time t4, wherein the multiple modification are made in a serial manner, as shown in 227.

Figure 3:
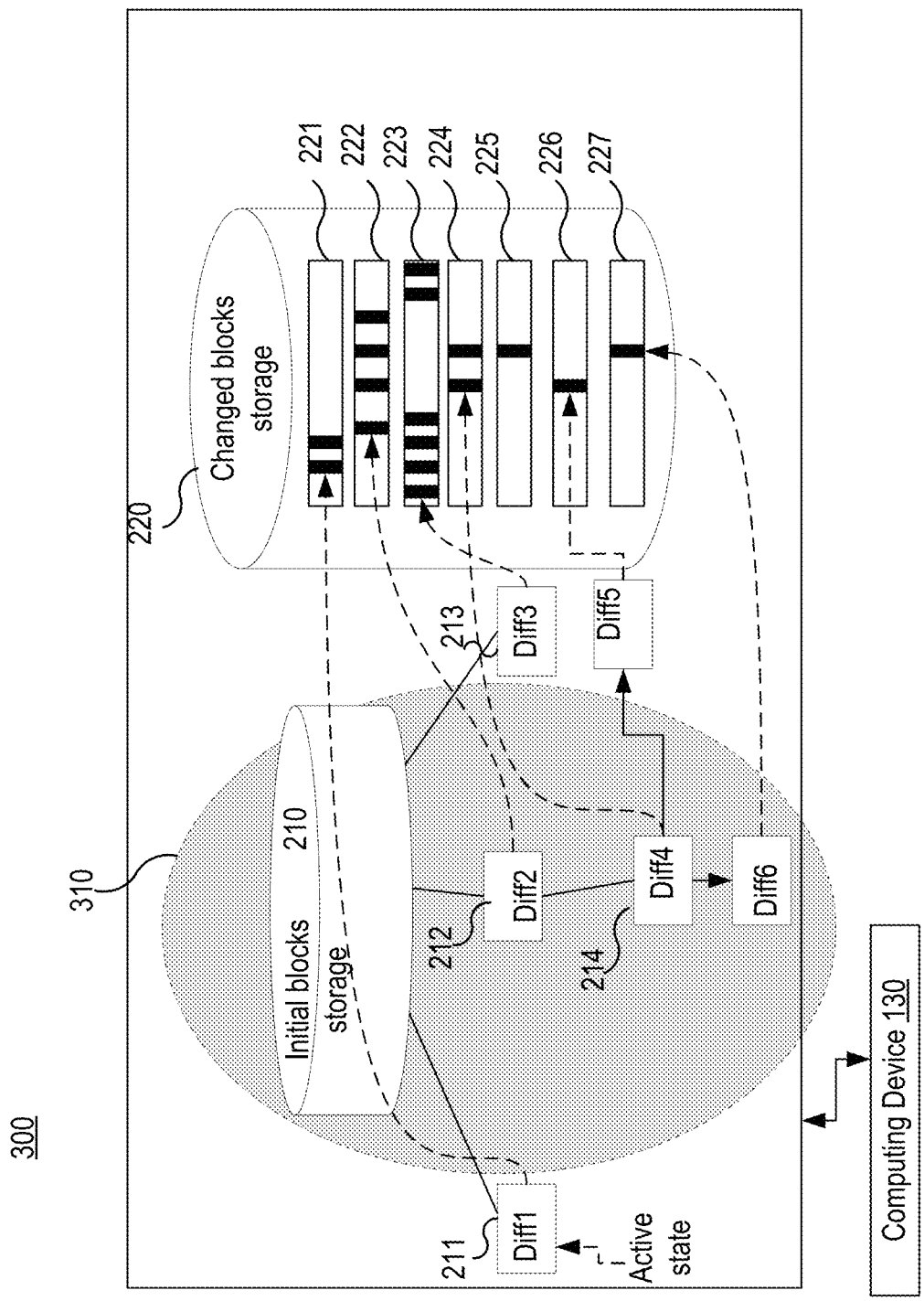
FIG. 3 illustrates initial blocks storage with a chain of snapshots.

In one aspect, the computing device may perform operations with any selected chain of snapshots. For example, the computing device may create an archive from a chain of snapshots response to a request from a user, etc. FIG. 3 illustrates initial blocks storage 210 with a chain of snapshots 310. An archive may be created for using the chain of snapshots created at times t6, t4 and t2, along with the initial state (which is located in the initial blocks storage 210). The archive would then include the data in the initial blocks storage 210, and the changed data that correspond to diff2, diff4 and diff6, which are stored in the changed blocks storage 220.

In one aspect, the selected chain of snapshots may be virtualized. For example, a sequence of states of snapshots may be converted to a virtual machine image. In other words, the virtualized chain of snapshots may be stored in a distributed storage.

Figure 4:
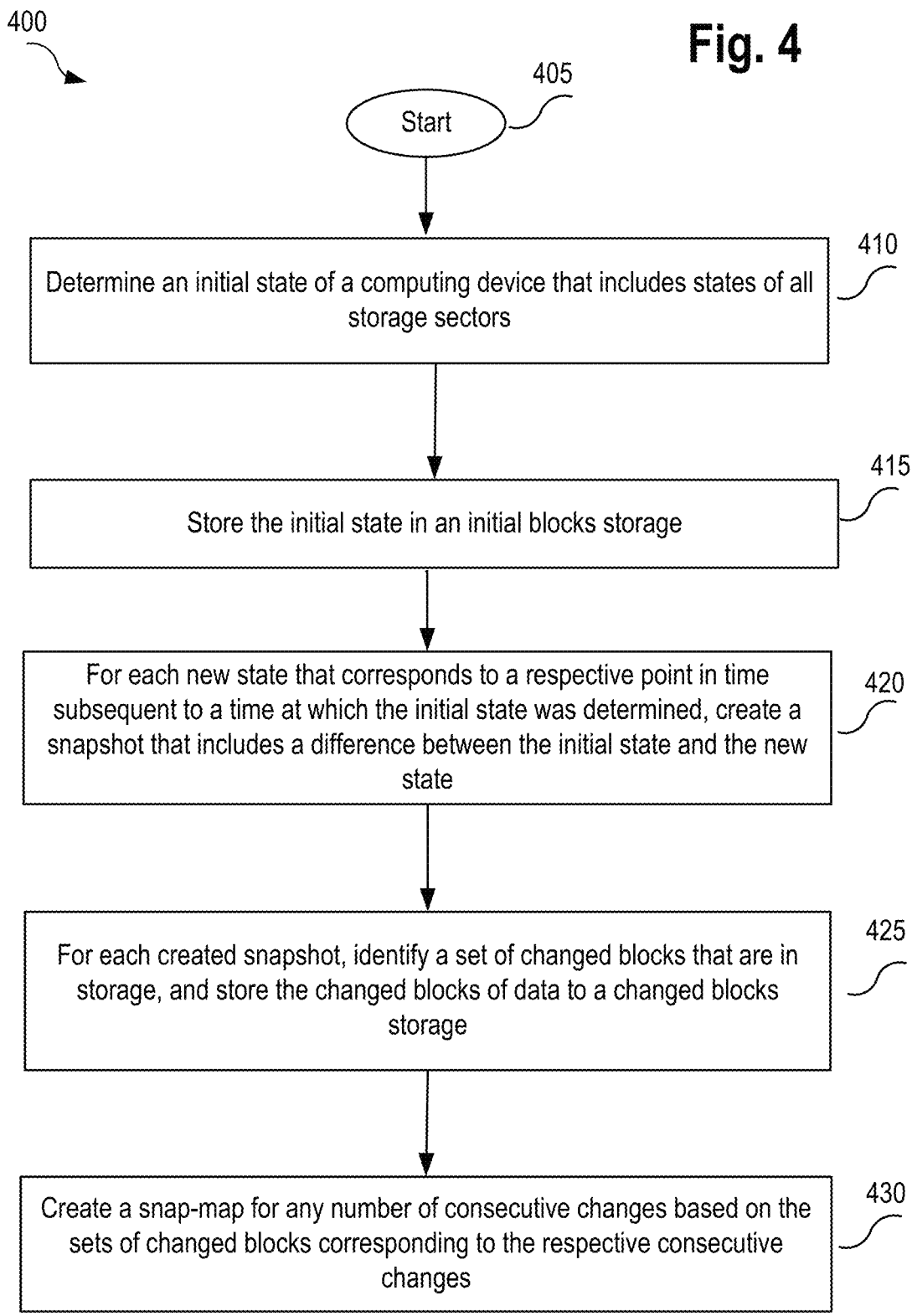
FIG. 4 illustrates a flow diagram of a method for storing and managing states of a computer in accordance with aspects of the present disclosure.

FIG. 4 illustrates a flow diagram of a method 400 for storing and managing states of a computing device in accordance with aspects of the present disclosure. Method 400 stars in step 405 and proceeds to step 410.

In step 410, method 400, determines an initial state of the computing device, wherein the initial state includes states of all storage sectors associated with the computing device.

In step 415, method 400, stores the determines initial state in an initial blocks storage.

In step 420, method 400, for each new state that corresponds to a respective point in time subsequent to a time at which the initial state was determined, the method creates a snapshot, where the created snapshot includes a difference between the initial state and the new state.

In step 425, for each created snapshot, method 400 identifies a set of changed blocks that are in storage, and stores the changed blocks of data to a changed blocks storage.

In step 430, method 400, creates a snap-map for any number of consecutive changes based on the sets of changed blocks corresponding to the respective consecutive changes.

In one aspect, when a request to roll back a state of the computing device to a state that corresponds to a given point in time is received, the method further comprises: rolling back the state of a computing device in accordance with the request and the snap-map.

In one aspect, when the rolling back is from one snapshot to another snapshot, unchanged data is used directly from the initial blocks storage while changed date is used by redirecting to the changed blocks storage.

In one aspect, the snapshot is created at least in accordance with: a predetermined schedule, when a change to data is detected, or when the change is detected for a predetermined list of types of data.

In one aspect, a user of the computing device determines the types of data for which the change triggers the creation of the snapshot.

In one aspect, the method further comprises: forming a tree structure of changes by creating branches and sub-branches of changes using the snap-map, and creating any number of chains of snapshots.

In one aspect, the method further comprises: performing, by the computing device, any number of operations with a selected chain of snapshots, the operations including at least one of: creating an archive from a chain of snapshots and responding to a request from a user.

In one aspect, the selected chain of snapshots is virtualized.

In one aspect, the method further comprises: making any number of changes to any set of previously changed blocks, wherein multiple changes are made to the set of previously changed blocks in a serial or in a parallel manner.

In one aspect, the changed blocks storage is located on one or more of: the same computing device, a different computing device, a different storage area of the same computing device, or an external device.

FIG. 5 is a block diagram illustrating a computer system 20 on which aspects of systems and methods for storing and managing states of a computing device may be implemented in accordance with an exemplary aspect. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable code implementing the techniques of the present disclosure. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system. Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for storing and managing states of a computing device, the method comprising:
   determining an initial state of the computing device, wherein the initial state includes states of all storage sectors associated with the computing device;
   storing the determined initial state in an initial blocks storage;
   for each new state that corresponds to a respective point in time subsequent to a time at which the initial state was determined, creating a snapshot, where the created snapshot includes a difference between the initial state and the new state;
   for each created snapshot, identifying a set of changed blocks that are in storage, and storing the changed blocks of data to a changed blocks storage;
   creating a snap-map for any number of consecutive changes based on the sets of changed blocks corresponding to the respective consecutive changes; and
   when a request to roll back a state of the computing device to a state that corresponds to a given point in time is received,
      identifying, via the snap-map, a respective snapshot associated with the given point in time; and
      rolling back to the respective snapshot using only unchanged blocks of the initial blocks storage and changed blocks of the respective snapshot stored in the changed blocks storage.

2. The method of claim 1, wherein the snapshot is created at least in accordance with: when a change to data is detected, or when the change is detected for a predetermined list of types of data.

3. The method of claim 2, wherein a user of the computing device determines the types of data for which the change triggers the creation of the snapshot.

4. The method of claim 1, further comprising:
   forming a tree structure of changes by creating branches and sub-branches of changes using the snap-map, and creating any number of chains of snapshots.

5. The method of claim 4, further comprising:
   performing, by the computing device, any number of operations with a selected chain of snapshots, the operations including at least one of: creating an archive from a chain of snapshots and responding to a request from a user.

6. The method of claim 5, wherein the selected chain of snapshots is virtualized.

7. The method of claim 1, further comprising:
   making any number of changes to any set of previously changed blocks, wherein multiple changes are made to the set of previously changed blocks in a serial or in a parallel manner.

8. The method of claim 1, wherein the changed blocks storage is located on one or more of: the same computing device, a different computing device, a different storage area of the same computing device, or an external device.

9. A system for storing and managing states of a computing device, comprising:
   at least one processor of a server, the processor configured to:
      determine an initial state of the computing device, wherein the initial state includes states of all storage sectors associated with the computing device;
      store the determined initial state in an initial blocks storage;

for each new state that corresponds to a respective point in time subsequent to a time at which the initial state was determined, create a snapshot, where the created snapshot includes a difference between the initial state and the new state;

for each created snapshot, identify a set of changed blocks that are in storage, and storing the changed blocks of data to a changed blocks storage; and create a snap-map for any number of consecutive changes based on the sets of changed blocks corresponding to the respective consecutive changes; and when a request to roll back a state of the computing device to a state that corresponds to a given point in time is received, identify, via the snap-map, a respective snapshot associated with the given point in time; and roll back to the respective snapshot using only unchanged blocks of the initial blocks storage and changed blocks of the respective snapshot stored in the changed blocks storage.

10. The system of claim 9, wherein the snapshot is created at least in accordance with: when a change to data is detected, or when the change is detected for a predetermined list of types of data.

11. The system of claim 10, wherein a user of the computing device determines the types of data for which the change triggers the creation of the snapshot.

12. The system of claim 9, wherein the processor is further configured to:

form a tree structure of changes by creating branches and sub-branches of changes using the snap-map, and creating any number of chains of snapshots.

13. The system of claim 12, wherein the processor is further configured to:

perform, by the computing device, any number of operations with a selected chain of snapshots, the operations including at least one of: creating an archive from a chain of snapshots and responding to a request from a user.

14. The system of claim 13, wherein the selected chain of snapshots is virtualized.

15. The system of claim 9, wherein the processor is further configured to:

make any number of changes to any set of previously changed blocks, wherein multiple changes are made to the set of previously changed blocks in a serial or in a parallel manner.

16. The system of claim 1, wherein the changed blocks storage is located on one or more of: the same computing device, a different computing device, a different storage area of the same computing device, or an external device.

17. A non-transitory computer readable medium storing thereon computer executable instructions for storing and managing states of a computing device, including instructions for:

determining an initial state of the computing device, wherein the initial state includes states of all storage sectors associated with the computing device;

storing the determined initial state in an initial blocks storage;

for each new state that corresponds to a respective point in time subsequent to a time at which the initial state was determined, creating a snapshot, where the created snapshot includes a difference between the initial state and the new state;

for each created snapshot, identifying a set of changed blocks that are in storage, and storing the changed blocks of data to a changed blocks storage;

creating a snap-map for any number of consecutive changes based on the sets of changed blocks corresponding to the respective consecutive changes; and when a request to roll back a state of the computing device to a state that corresponds to a given point in time is received, identifying, via the snap-map, a respective snapshot associated with the given point in time; and rolling back to the respective snapshot using only unchanged blocks of the initial blocks storage and changed blocks of the respective snapshot stored in the changed blocks storage.

18. The non-transitory computer readable medium of claim 17, wherein the snapshot is created at least in accordance with: when a change to data is detected, or when the change is detected for a predetermined list of types of data.

19. The non-transitory computer readable medium of claim 18, wherein a user of the computing device determines the types of data for which the change triggers the creation of the snapshot.

20. The non-transitory computer readable medium of claim 17, the instructions further comprising instructions for:

forming a tree structure of changes by creating branches and sub-branches of changes using the snap-map, and creating any number of chains of snapshots.

21. The non-transitory computer readable medium of claim 20, the instructions further comprising instructions for:

performing, by the computing device, any number of operations with a selected chain of snapshots, the operations including at least one of: creating an archive from a chain of snapshots and responding to a request from a user.

22. The non-transitory computer readable medium of claim 21, wherein the selected chain of snapshots is virtualized.

23. The non-transitory computer readable medium of claim 17, the instructions further comprising instructions for:

making any number of changes to any set of previously changed blocks, wherein multiple changes are made to the set of previously changed blocks in a serial or in a parallel manner.

24. The non-transitory computer readable medium of claim 17, wherein the changed blocks storage is located on one or more of: the same computing device, a different computing device, a different storage area of the same computing device, or an external device.

* * * * *